(12) United States Patent
Mitchell et al.

(10) Patent No.: US 8,341,125 B2
(45) Date of Patent: *Dec. 25, 2012

(54) TRANSACTION LOG MANAGEMENT

(75) Inventors: Ian James Mitchell, Eastleigh (GB); Andrew Wright, Eastleigh (GB)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,555

(22) Filed: Jan. 22, 2012

(65) Prior Publication Data

US 2012/0124021 A1 May 17, 2012

Related U.S. Application Data

(63) Continuation of application No. 12/179,107, filed on Jul. 24, 2008, now Pat. No. 8,140,483.

(30) Foreign Application Priority Data

Sep. 28, 2007 (EP) ..................... 07117548

(51) Int. Cl.
*G06F 17/30* (2006.01)
(52) U.S. Cl. ................... 707/672; 711/154; 714/723
(58) Field of Classification Search .................. 707/672; 711/154, 162, 167; 714/723; 717/140
See application file for complete search history.

(56) References Cited

U.S. PATENT DOCUMENTS

| | | | |
|---|---|---|---|
| 5,948,110 A | 9/1999 | Hitz et al. | |
| 5,996,086 A | 11/1999 | Delaney et al. | |
| 6,035,417 A | 3/2000 | Kanazawa | |
| 6,044,444 A | 3/2000 | Ofek | |
| 6,119,244 A | 9/2000 | Schoenthal et al. | |
| 6,145,068 A | 11/2000 | Lewis | |
| 6,732,124 B1 | 5/2004 | Koseki et al. | |
| 7,117,229 B2 | 10/2006 | Marshall et al. | |
| 7,590,806 B2 | 9/2009 | Harris et al. | |
| 7,730,153 B1 | 6/2010 | Gole et al. | |
| 8,020,046 B2 * | 9/2011 | Burghard et al. | ............ 714/47.1 |
| 8,140,483 B2 * | 3/2012 | Mitchell et al. | ............... 707/672 |

(Continued)

FOREIGN PATENT DOCUMENTS

EP 0 250 847 A2 1/1988

(Continued)

OTHER PUBLICATIONS

PCT International Search Report and Written Opinion for application PCT/EP2008/061682, mailed Feb. 17, 2009, 13 pages.

(Continued)

*Primary Examiner* — Jean M Corrielus
(74) *Attorney, Agent, or Firm* — Sterne, Kessler, Goldstein & Fox PLLC

(57) ABSTRACT

Managing a log-full condition of a transaction log in a transaction processing system, where the transaction log has a plurality of log records each associated with a particular transaction. When a log-full condition is detected, the active transaction having the oldest log entry of all active transactions is identified and logging for all transactions except for the identified transaction is temporarily suspended. A dynamic transaction backout of the identified transaction is initiated, with the writing of a backout record for the identified transaction to the log being delayed. Confirmation that the backout has completed is awaited before trimming the log. Then the delayed backout record for the identified transaction is written to the log, and normal logging is resumed.

20 Claims, 5 Drawing Sheets

U.S. PATENT DOCUMENTS

| | | |
|---|---|---|
| 2003/0135478 A1 | 7/2003 | Marshall et al. |
| 2007/0130238 A1 | 6/2007 | Harris et al. |
| 2007/0136365 A1 | 6/2007 | Tarditi et al. |
| 2007/0143276 A1 | 6/2007 | Harris |
| 2007/0143360 A1 | 6/2007 | Harris et al. |
| 2007/0143741 A1 | 6/2007 | Harris |
| 2007/0169030 A1 | 7/2007 | Tarditi et al. |
| 2007/0169031 A1 | 7/2007 | Harris |
| 2009/0089339 A1 | 4/2009 | Mitchell et al. |
| 2009/0100113 A1* | 4/2009 | Burghard et al. ............. 707/202 |
| 2009/0100434 A1* | 4/2009 | Burghard et al. ............. 718/103 |
| 2009/0240742 A1* | 9/2009 | Burghard et al. ............. 707/202 |
| 2012/0124021 A1* | 5/2012 | Mitchell et al. ............... 707/703 |

FOREIGN PATENT DOCUMENTS

| | | | |
|---|---|---|---|
| EP | 0 549 325 | A2 | 6/1993 |
| EP | 1 806 668 | A2 | 1/2006 |

OTHER PUBLICATIONS

Ian J. Mitchell, et al., U.S. Appl. No. 12/279,107, filed Jul. 24, 2008, Office Action, Dec. 27, 2010, 8 pages.

Ian J. Mitchell, et al., U.S. Appl. No. 12/279,107, filed Jul. 24, 2008, Interview Summary, Mar. 23, 2011, 3 pages.

Ian J. Mitchell, et al., U.S. Appl. No. 12/279,107, filed Jul. 24, 2008, Office Action, May 26, 2011, 10 pages.

Ian J. Mitchell, et al., U.S. Appl. No. 12/279,107, filed Jul. 24, 2008, Pre-Appeal Brief Conference Decision, Sep. 12, 2011, 2 pages.

Ian J. Mitchell, et al., U.S. Appl. No. 12/279,107, filed Jul. 24, 2008, Notice of Allowance, Dec. 12, 2011, 13 pages.

* cited by examiner

TRANSACTION LOG MANAGEMENT

BACKGROUND OF THE INVENTION

Field of the Invention

The present invention relates to the field of transaction processing and in particular to a system and method for managing a transaction log.

Transactions are familiar to us in everyday life when we exchange money for goods and services, such as buying a train ticket or paying for medicine. Such transactions involve a short conversation (for example, requesting availability and cost), and then making the payment. The processing of any one of these items is a business transaction of the kind that is handled by a transaction management system.

A transaction in the business sense can be viewed as an activity that must be completed in its entirety with a mutually agreed-upon outcome. It usually involves operations on some shared resources and results in overall change of state affecting some or all of those resources. When an activity or a transaction has been started and the mutually agreed outcome cannot be achieved, all parties involved in a transaction should revert to the state they were in before its initiation. In other words, all operations should be undone as if they had never taken place.

There are many examples of business transactions. A common one involves transfer of money between bank accounts. In this scenario, a business transaction would be a two-step process involving subtraction (debit) from one account and addition (credit) to another account. Both operations are part of the same transaction and both must succeed in order to complete the transaction. If one of these operations fails, the account balances must be restored to their original states.

Typically such transactions consist of many computing and data access tasks to be executed in one or more machines; the tasks may include handling the user interface, data retrieval and modification, and communications. In the example above, the money transfer operation is a transaction composed of debiting one account and crediting another.

In the context of business software, we can express the above more precisely. A transaction (sometimes also referred to as a 'Unit-Of-Work' or 'UOW') is a set of related operations that must be completed together. All their recoverable actions must either complete successfully or not at all. This property of a transaction is referred to as 'atomicity'.

In the simplest case, a transaction will access resources connected to a single computer processor. Such a transaction is referred to as a 'local transaction'. More often, however, a transaction will access resources which are located in several different computer processors, or logical partitions, each maintaining its own transaction log. Such a transaction is referred to as a 'distributed transaction'.

When a distributed transaction ends, the atomicity property of transactions requires that either all of the processors involved commit the transaction or all of them abort the transaction. To achieve this one of the processors takes on the role of coordinator to ensure the same outcome at all of the parties to the transaction, using a 'coordination protocol' that is commonly understood and followed by all the parties involved. The two-phase commit protocol has been widely adopted as the protocol of choice in the distributed transaction management environment. This protocol guarantees that the work is either successfully completed by all its participants or not performed at all, with any data modifications being either committed together (completed) or rolled back (backed out) together on failure.

Another property of a transaction is its durability. This means that once a user has been notified of success, a transaction's outcome must persist, and not be undone, even when there is a system failure. A recovery manager is used to ensure that a system's objects are durable and that the effects of transactions are atomic even when the system crashes. The recovery manager saves information required for recovery purposes. This recovery can be for the dynamic backout of a transaction, perhaps as a result of a failure after a task updated a recoverable temporary storage queue. Additionally the recovery data can be used for restoring a transaction processing system to a committed state, for example when the system is restarted after system failure. Typically, the recovery file comprises at least one log containing the history of the transactions performed by a transaction processing system. In the event of a system failure, the recovery file can be played back to return the system to its state right before the failure, and the transaction log(s) used to check for and undo transactions that were not properly completed before failure.

Also, in the event of a transaction failure, the transaction log can be used to reverse updates that have been carried out by that transaction, by working backwards from the last change before the failure, hence the name 'dynamic transaction backout'. The backout occurs before any locks on any affected resources are released, which safeguards other tasks from the possibility of using corrupted data, because modified data is not released for use by them ("committed") until the current task has finished with it. In case the log needs to be replayed later in a system restart, an entry is first made in the log to indicate that that transaction is being backed out.

Examples of systems which carry out such transaction logging include transaction systems such as IBM® CICS® Transaction Server or IBM WebSphere® Application Server, as well as database systems such as IBM DB2® or IBM IMS™. (IBM, CICS, WebSphere, DB2 and IMS are trademarks or registered trademarks of International Business Machines Corporation) in the United States, other countries, or both.)

The log typically records the information in the order that the activity occurs. Without some management, this would consume an ever increasing amount of resource. So it must be reorganised on a regular basis so as to reduce its size by the recovery manager carrying out a process called 'keypointing'. Keypointing comprises writing current committed values of a system's objects to a new portion of the recovery file, together with transaction status entries and intentions lists for transactions that have not been fully resolved. An intentions list for a transaction contains a list of the references and the values of all the objects/resources that are altered by that transaction, as well as information related to the two-phase commit protocol. Once a keypoint has been taken, i.e. information stored through a keypointing procedure, recovery information for irrevocably committed (or backed out) transactions can usually be discarded from the log, sometimes called 'trimming' the log. This reduces the file size of the log as well as the number of transactions to be dealt with during recovery.

The rate that old log records are deleted by trimming should ideally match the rate at which new log data is being generated as new work enters the transaction system and makes its own recoverable changes to resources. In a well tuned on-line transaction processing (OLTP) environment, the volume of log data held on the log should remain reasonably constant over time, with an underlying periodic rise and fall in the number of log records held on the log as both the new work and the housekeeping work are performed.

This mechanism for log data deletion usually solves the problem of logs continually growing in size over time. However, a long-running UOW can prevent this mechanism from working as until such a UOW has completed, and its log data is no longer required, its data cannot be deleted from the log and all data logged since the first log entry of that UOW must be maintained on the log. Hence, the system will not be able to trim the log after keypointing, and the log will grow and grow in size. Eventually, when a critical threshold of the logging subsystem, the operating system, or the available hardware is exceeded, this will result in a request to write to the log failing for an "out of space" type of condition. When such an error is returned to the transaction system, it typically results in a serious failure. The system can no longer log any recoverable changes and so protect them from failures that require them to be backed out. Recovery processing (and hence data integrity) can no longer be guaranteed.

In many cases the transaction system will terminate, and an emergency restart of the system will be required in order to recover it to a consistent state once more. However, this process will very likely also fail since the log media is now full. The information for the uncommitted long-running UOW needs to be read back from the log in order to rebuild locks on the recoverable resources it was manipulating, and then drive backout processing to undo these changes. However, a transaction system cannot delete this data from the log until this backout has completed. Any new work that needs to log its recoverable changes will therefore fail with the same log-full condition as before, and the system will terminate once again. In such a situation, the only viable solution will probably be to scratch and redefine the log media, and restart the system 'cold'. This avoids the need to refer to any old log data from the previous run of the system; the downside is that data integrity is now lost for the recoverable changes made by any active (i.e. uncommitted) work from the previous run.

Strategies aimed to avoid the occurrence of a log-full condition, such as monitoring log usage and taking steps to reduce the log size may be employed. However, even with such measures in place, there may still be occasions when the available log space becomes exhausted. The present invention aims to address these problems.

SUMMARY OF THE INVENTION

A first aspect of the invention provides a method for managing a log-full condition of a transaction log in a transaction processing system, the transaction log comprising a plurality of log records each associated with a particular transaction. The method comprises detecting a log-full condition; identifying an active transaction having the oldest log entry of all active transactions; and temporarily suspending logging for all transactions except for the identified transaction. A dynamic transaction backout of the identified transaction is initiated, with the writing of a backout record for the identified transaction to the log being delayed. The method waits for confirmation that the backout has completed before trimming the log. Then the delayed backout record for the identified transaction is written to the log and normal logging is resumed.

Preferably, the step of delaying comprises 'pretending', when a request to write a backout record to the log for the identified transaction is received, that the requested backout record has been written to the log, without actually having yet written the record to the log.

A second aspect of the invention provides an apparatus for managing a log-full condition of a transaction log in a transaction processing system, the transaction log comprising a plurality of log records each associated with a particular transaction. The apparatus comprises code executable, using a processor, for detecting a log-full condition; for identifying an active transaction having the oldest log entry of all active transactions and temporarily suspending logging for all transactions except for the identified transaction; for initiating a dynamic transaction backout of the identified transaction; for delaying writing of a backout record for the identified transaction to the log; for waiting for confirmation that the backout has completed; for trimming the log, and for then writing the delayed backout record to the log for the identified transaction, and resuming normal logging.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
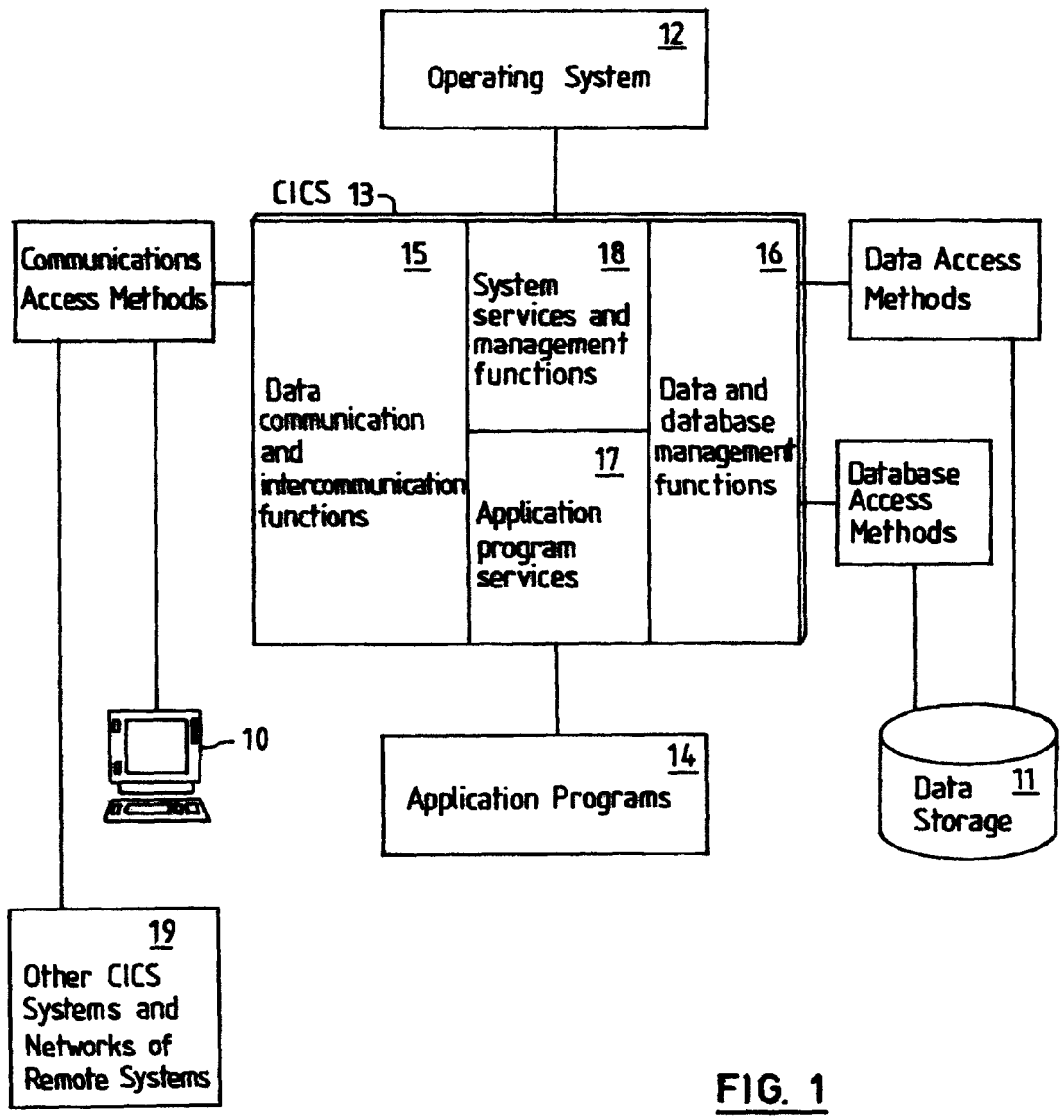
FIG. 1 shows an overview of a transaction processing system suitable for the implementation of a method according to the invention.

One preferred embodiment of the invention is implemented in relation to IBM's general purpose online transaction processing (OLTP) software, CICS®. FIG. 1 shows a CICS transaction processing system including associated hardware and software. The hardware includes terminals such as 10 and databases and files such as 11. A host computer operating system 12, such as MVS®, or z/OS®, supplies general data processing services to CICS software 13. The CICS software may be regarded as a subsidiary operating system, or application server, which provides specialized online services to provide an environment for execution of online application programs 14, typically written by a customer for a specific online transaction processing application. (MVS and z/OS are registered trademarks of International Business Machines Corporation in the United States, other countries, or both.)

Application programs give users online access to their data and the ability to send messages to other CICS users. In addition, application programs running under CICS can communicate with other programs running elsewhere in the same computer system, or with other computing systems 19.

The CICS software 13 includes data communication functions 15 which provide an interface between CICS and local or remote terminals to make the input or output of data easier. They provide a degree of device independence and format independence for application programs. There are also multi-region operation (MRO) and intersystem communication (ISC) facilities.

CICS has interfaces to database products and to standard file access methods. CICS also has routines to handle queues and scratchpad data used within itself. Application program services 17 provide an interface between CICS and the application programs 14. System services 18 provide an interface between CICS and the operating system. They include functions to control CICS, and to share resources.

Data handling functions 16 provide an interface between CICS and stored data 11. They allow the data to be read or updated, while preventing unauthorised access. Moreover, these functions ensure the preservation of data and system integrity, both in normal operation and under error conditions. In particular, these functions include recovery mechanisms and transaction logging.

Figure 2:
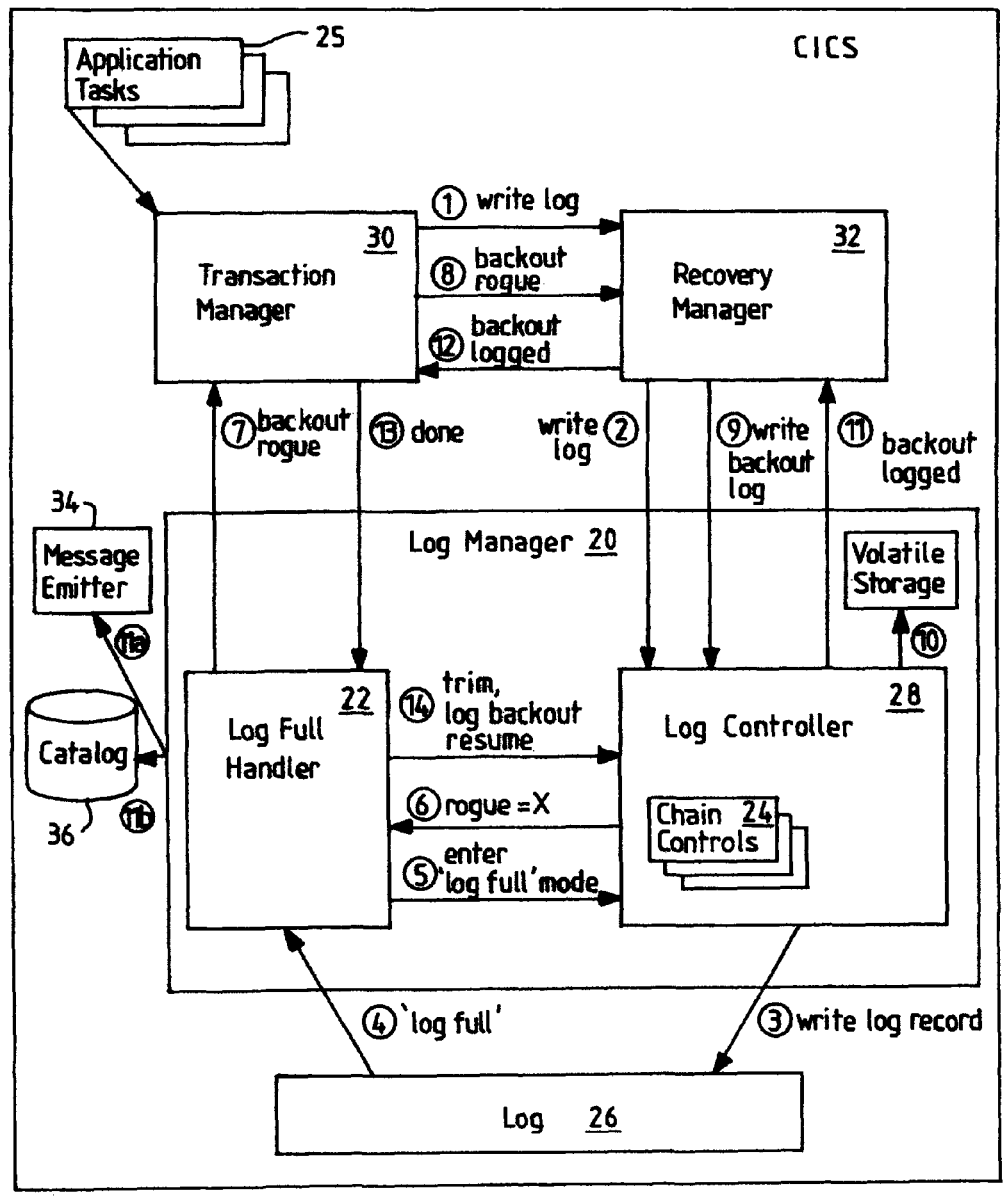
FIG. 2 shows the components for implementing the invention according to a preferred embodiment.

The method and system of the preferred embodiment will now be explained in further detail with reference to FIG. 2, which shows the main components, as well as the process flows, involved. The system comprises Log Manager 20, Transaction Manager 30, Log 26, Recovery Manager 32, Message Emitter 34, and Catalog 36.

The CICS Recovery Manager 32 coordinates UOW and CICS system recovery. The Recovery Manager invokes the Log Manager to store and retrieve log data for commit and backout purposes.

In CICS, the transaction log 26 used to support system recovery and dynamic transaction backout is called the CICS System Log. This is used to store log records required to provide dynamic transaction backout of a failing Unit-Of-Work (UOW); for example, when a task abends having written to a recoverable Virtual Storage Access Method (VSAM) file. In addition, the CICS System Log is used for recovering an entire CICS system to a committed state when performing an emergency restart.

In order to ensure atomicity of the distributed transaction in which an application changes data in multiple systems/regions, the CICS Recovery Manager is used to ensure that all of those changes are accomplished through a single commit request. Synchronization points (syncpoints), which cause the Recovery Manager to commit the recoverable work of an application 14, can be explicitly requested by the application or implicitly driven at task termination.

The two-phase commit process is as follows.

1) First phase: the CICS Recovery Manager prepares a UOW's work prior to committing. The Recovery Manager asks all resource owners having an interest in the recoverable work performed by a UOW to prepare to commit. If a given resource owner can commit its work, it replies affirmatively, agreeing to accept the outcome decided by the recovery manager. It can no longer unilaterally abort the transaction. Such a resource owner is said to be in the ready-to-commit or prepared state. If a resource owner cannot commit, it responds negatively and rolls back its work. For a distributed UOW, the Recovery Manager will first prepare each of the local CICS system's resource owners that have a vested interest in the in the recoverable work performed by the UOW. For example, this might be file control (if the UOW has updated a recoverable VSAM file), temporary storage (if it has updated a recoverable temporary storage queue), etc. Having prepared the various resource owners in this way, Recovery Manager will then drive each of the connected systems and subsystems involved in aspects of the UOW. This might (for example) involve asking another CICS system to prepare its own aspects of a distributed UOW, where some of the recoverable changes were made on another CICS system remote from this one, say as the result of function shipping activity. Alternatively, it might involve calling a remote resource such as a DB2 database to prepare its own recoverable changes made during the UOW. Assuming these preparatory steps complete successfully, and the UOW is suitably prepared, then it can switch states from being active, sometimes referred to as 'inflight', to being committed. Recovery Manager will log the fact that the UOW is committing to the CICS system log, by calling the Log Manager. It will then perform the second part of the two-phase process.

2) Second phase: the Recovery Manager calls the connected systems to instruct them to commit their changes. Once they have all returned control indicating they have now committed their own responsibilities towards the UOW, CICS Recovery Manager will complete the syncpoint by calling the local CICS system's resource owners once more, to have them commit their own changes too. At the end of this process, assuming all has worked successfully, the UOW will complete and the syncpoint will end. When all the changes are committed, the Recovery Manager updates a system log with a commit record for the transaction. If any piece of the transaction is not successful, the Recovery Manager updates the system log with a backout record and then backs out all changes.

The Log Manager 20 manages log data in entities known as log streams. A log stream is a series of blocks of data. Each log stream is identified by its own (unique) log stream identifier, known as the log stream name. The CICS Log Manager implements various log streams for its own use, and others are available for user purposes. CICS Log Manager is responsible for handling the movement and manipulation of UOW log data on CICS System Log streams.

The Log Manager comprises a Log Control 28, which includes a plurality of chain controls 24, and which monitors write requests to the log stream and maintains a count of bytes to the log. Additionally, the Log Manager comprises a log full handler 22.

Figure 4:
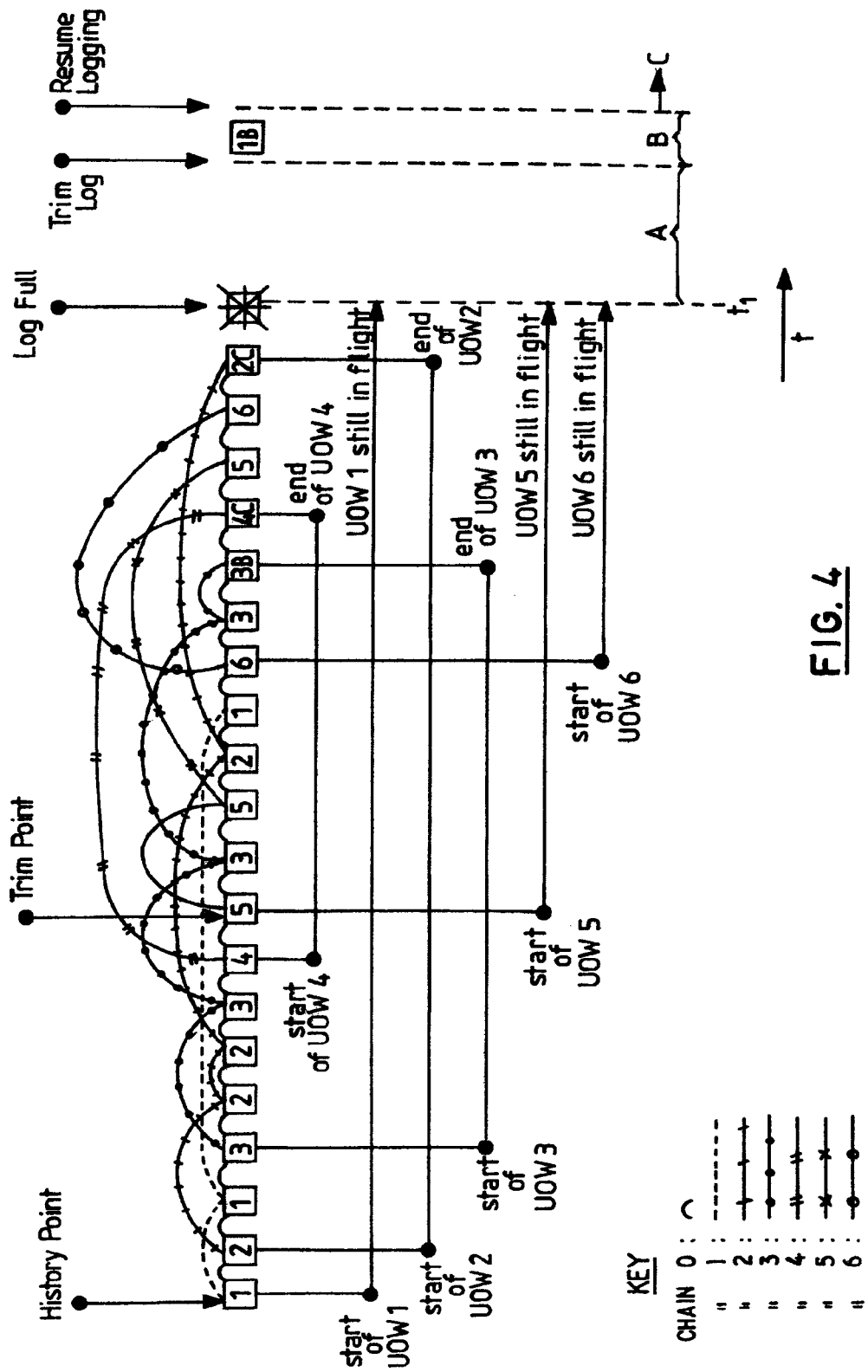
FIG. 4 shows a simple example log stream for explanation purposes.

The CICS System Log records "before-images" of changes to resources managed under CICS. Each log record is associated with a particular UOW and has an ID number called the 'blockid', which orders the log records in a sequential manner. Additionally, a log record may have a pointer to the blockid of the previous log record associated with the same UOW. Thus the log records are said to be linked together in 'chains' associated with particular UOWs, as well as in chronological order, as shown in FIG. 4. In this example of a log stream, at time $t_1$ UOWs 1, 2, 3, 4, 5 and 6 have each written to the log. Chain 0 represents a sequential chain from each log record back to the preceding record. Chains 1 to 6 link together log records associated with UOWs 1 to 6 respectively.

Tasks within CICS can issue syncpoints to mark their work as consistent and ready to be committed. Part of syncpoint processing involves the logical deletion of the log data for the task's UOW. This data is still held on the System Log however, and needs to be deleted by a call to the Log Manager, which CICS issues periodically as part of activity keypoint processing. At the time of an activity keypoint, the CICS Log Manager trims the tail of the System Log by determining the position, called the 'trim point' or 'history point', of the oldest log data still required for any UOW of interest to CICS, and deleting System Log data created before this point.

Figure 3:
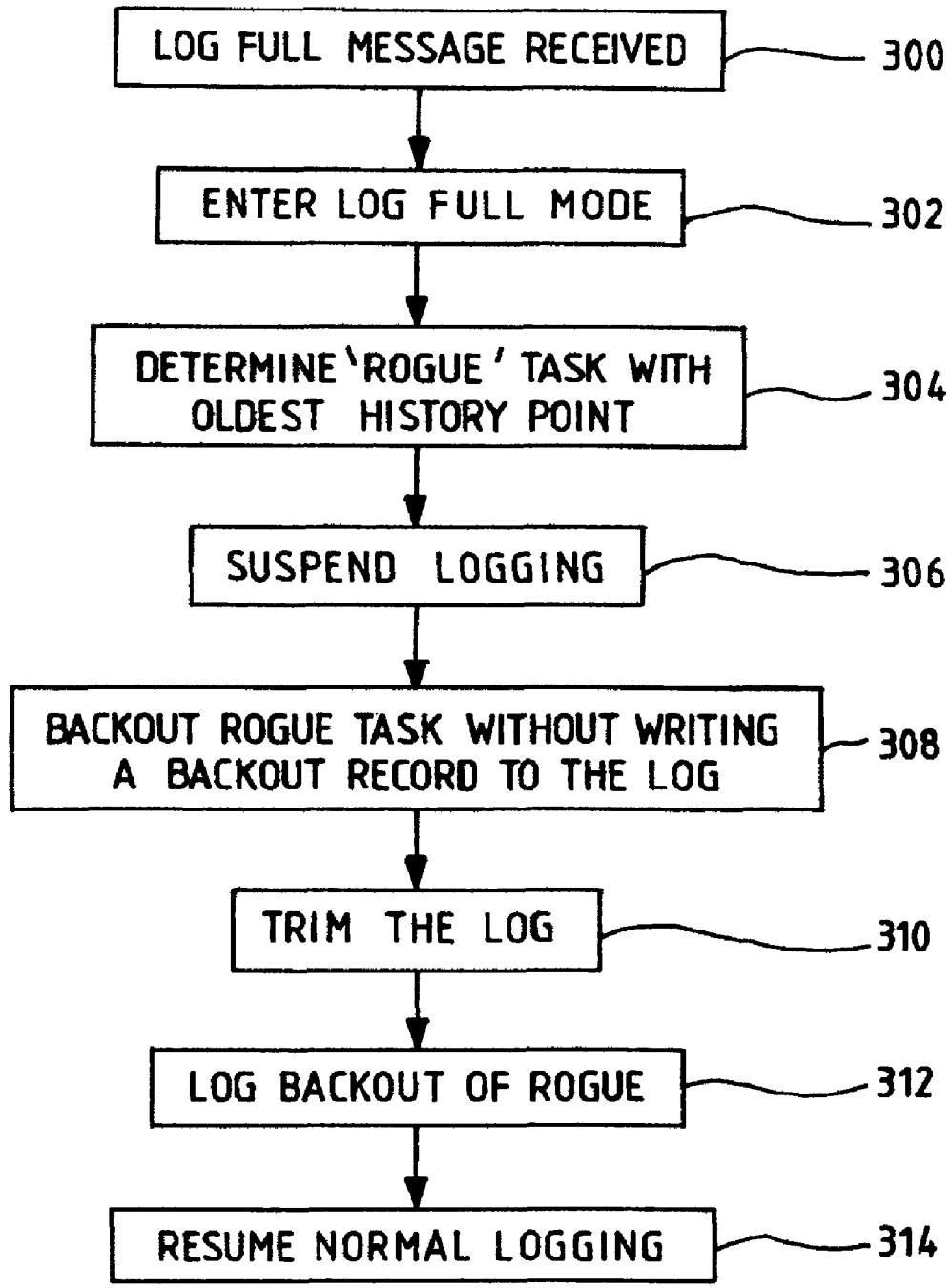
FIG. 3 shows a method of managing a log-full condition according to a preferred embodiment of the invention.

A method for dealing with a log-full situation according to a preferred embodiment of the invention will now be described with reference to FIGS. 2 to 4. When an attempt to write to the log results in a 'log full' message being received 300 by the log manager 24, the message is passed [4] to the log full handler 22. The log full handler component instructs [5] the log controller 28 to enter 302 a 'log full' mode, in which it identifies 304 the 'rogue' task, that is the one having the oldest history point on the log, and informs [6] the log full handler of the identity of the rogue task. The log controller suspends 306 logging for all tasks except the rogue (and thereby suspends all tasks that attempt to log except for the rogue), since it is no longer possible to add to the log. This will have the effect of stopping recoverable work for the period needed to perform these actions, but this is less disruptive than losing the entire system and having to "cold" start without recovery.

The log full handler sends [7] an instruction to the transaction manager to back out 308 the task identified as the 'rogue'. This causes the recovery manager to request [9] that a backout log record be entered on the log for the rogue task. Whilst in its log-full mode, the log controller will respond [11] to a log attempt by the rogue task by 'pretending' to log the request. This means that it replies to the recovery manager that the requested log record has been entered on the log, without actually having made an entry in the log. This reply ensures that the rogue task is not suspended, and that its backout will proceed. The log controller will temporarily store [10] the backout log entry in volatile memory, and will also inform [11a] a message emitter 34 or record a message [11b] in non-volatile storage other than the log, such as the CICS Catalog 36, identifying the rogue transaction that is being backed out. (This information is then available if needed later to explain an incomplete log chain in the event of system failure before the backout record is entered on the log, as will be described later).

Once the transaction manager has completed the back out of the rogue task it will inform [13] the log full handler that the backout is finished. The log full handler then instructs [14] the log controller to complete the final phase of its log full mode, namely to trim the log 310, enter 312 a log record (1B) indicating the backout of the rogue task, and then resume its normal logging mode 314. The log-full condition will thus have been managed without the recovery manager or transaction manager having been aware of any problem.

Referring to FIG. 4, consider a log-full situation occurring at time $t_1$. As has been described above, when a log full condition arises and the log controller changes to 'log full' mode, it will determine the oldest point on the log stream of any log chain associated with a UOW which is still in-flight. Each chain instance will be examined and the lowest blockid will be used to determine the oldest history point. UOWs 2 and 4 have committed (signified by he 'C' in the final log records of each of these UOWs); and UOW 3 has been backed-out (signified by the 'B' in its final log record). So, the three chains of interest (still inflight) at time $t_1$ are those for UOWs 1, 5 and 6. UOW 1 has the lowest blockid (oldest history point), so the blockid of the log record at the start of UOW 1 is the history point (A) at the time the log-full condition occurs. Thus UOW 1 is identified as the 'rogue' task.

Once the log full condition has occurred, no further logging can take place until the tail of the log has been trimmed. To enable this, the rogue task, UOW 1, is backed out without a backout record having been entered onto the log. After the transaction manager has finished the backout of UOW 1, the log records for that UOW are no longer required. Then, in preparation for trimming the log, the log controller determines the 'new' oldest history point now that UOW 1 is no longer inflight, which in the example of FIG. 4 is the blockid of the log record at the start of UOW 5, and which is called the trim point. The Log Manager then trims the log by deleting all log stream blocks up to this trim point, thereby freeing up space on the log. This means that there is now space on the log to write the backout record (1B) for the rogue task and to enable the suspended work to begin again, and thus logging resumes.

The scheme described works fine in the absence of a system failure, but as the log manager does not immediately record the backout record for the rogue task in the log, before backing it out and trimming the log, problems may be encountered in the event of a system failure at certain points in the process, as will be now be explained with reference to FIG. 4. If the system fails during the backout but before the trimming of the log (time period A) then the absence of the backout record will be harmless since during the recovery the backout would simply be repeated. If the system fails after the trimming and the writing of the delayed backout record (time period C), then again it will look like a conventional situation. If the system fails after having trimmed the log, but before the (delayed) backout record could be written (B), then the rogue transaction will be incomplete on the log (its earliest records will be missing due to the log trim), but there will be no backout record excusing this. During a subsequent recovery, this would normally be symptomatic of a problem with the integrity of the log. However, there should be only one such transaction on the log, all others should be intact. If this happens, then we can detect this single oddity. Operators may be given the option to direct the system to tolerate this specific condition. Preferably, steps are taken to provide an explanation for the absence of this backout record in the event of a system failure. For example, when the log controller 'lies' to the recovery manager about logging the backout record for the rogue task a message emitter 34 is instructed [11a] to emit a human-readable message that the log is about to be trimmed (at the end of period A) that can inform the operator that, should recovery be required before the backout is logged (end of period B) then they will be asked to override the detection of the apparently incomplete transaction. In another example, at the time when the log controller 'lies' to the recovery manager about logging the backout record, the identity of the rogue transaction is sent [11b] to non-volatile storage, such as the CICS Catalog 36. Then, if a restart fails in time period B with a log chain being found to be half-trimmed, the system can check whether this log chain is the same as the log chain whose state/transaction/ID was catalogued earlier, and if this is the same then ignore the fact that the restart has encountered this incomplete log chain. This would automate the recovery process and take the responsibility of tying up two messages away from the operator.

A log full condition may be detected by the log control when a write to the log fills up the last available space on the log, indicating that no further writes to the log will succeed. Alternatively, a log full condition may be detected when a write to the log results in a log full error.

Figure 5:
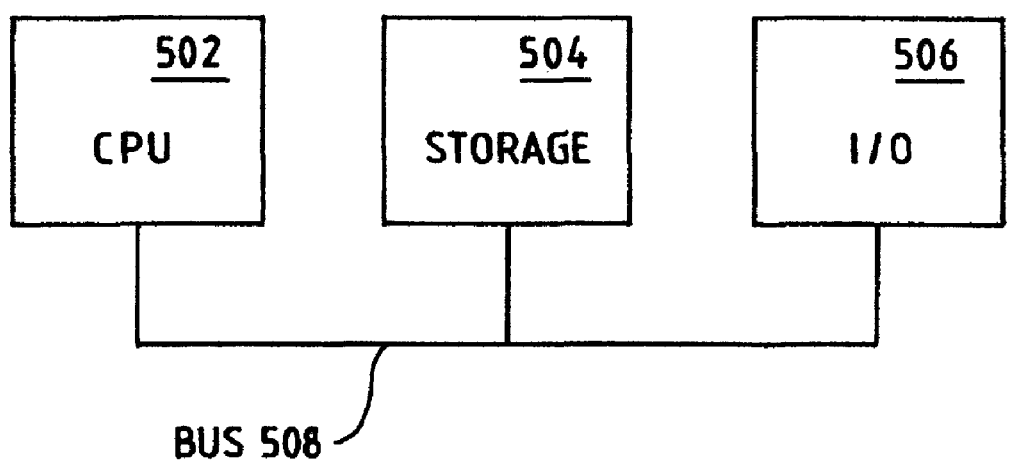
FIG. 5 shows an apparatus in which the present invention may be implemented.

FIG. 5 shows an apparatus in which the present invention may be implemented and which comprises: a central processing unit 502; a memory subsystem 504; an input/output subsystem 506; and a bus subsystem 508 interconnecting the central processing unit, the memory subsystem, the input/output subsystem.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method for managing a log-full condition of a transaction log in a transaction processing system, the transaction log comprising a plurality of log records each associated with a particular transaction, the method comprising:
   responsive to detecting the log-full condition, performing:
      identifying an active transaction having an oldest log entry of all active transactions having records in the log;
      temporarily suspending logging for all transactions except for the identified transaction;
      initiating a dynamic transaction backout of the identified transaction; and
      indicating that a backout record is written for the identified transaction to the log, the backout record serving to indicate that the identified transaction is backed out, although delaying the writing of the backout record to the log; and
   responsive to receiving confirmation that the backout of the identified transaction has completed, performing trimming the log;
   responsive to completion of the trimming, writing the backout record for the identified transaction to the log; and
   resuming normal logging.

2. The method according to claim 1, wherein the trimming comprises:
   determining an oldest log record still required for any active transaction other than the identified transaction; and
   deleting log records created prior to the determined oldest log record.

3. The method according to claim 1, wherein the indicating further comprises storing data identifying the transaction in a predetermined area of non-volatile storage.

4. The method according to claim 1, wherein the indicating further comprises sending a notification identifying the transaction for which the writing of the backout record to the log is being delayed.

5. The method according to claim 4, wherein sending the notification comprises sending a message in human-readable form to an administrator.

6. The method according to claim 1, further comprising:
   subsequent to the resuming of normal logging, discovering that the log an incomplete set of log records for a particular transaction;
   responsive to the discovery, comparing whether the particular transaction is the identified transaction for which the writing of the backout record was delayed, and if so, ignoring the discovery of the incomplete set of log records.

7. The method according to claim 1, wherein the log-full condition is detected by monitoring an amount of available space for storing log records in the transaction log.

8. Apparatus for managing a log-full condition of a transaction log in a transaction processing system, the transaction log comprising a plurality of log records each associated with a particular transaction, the apparatus comprising:
   a processor; and
   code executable, using the processor, to perform functions comprising:
      responsive to detecting the log-full condition, performing:
         identifying an active transaction having an oldest log entry of all active transactions having records in the log;
         temporarily suspending logging for all transactions except for the identified transaction;
         initiating a dynamic transaction backout of the identified transaction; and
         indicating that a backout record is written for the identified transaction to the log, the backout record serving to indicate that the identified transaction is backed out, although delaying the writing of the backout record to the log; and
      responsive to receiving confirmation that the backout of the identified transaction has completed, performing trimming the log;
      responsive to completion of the trimming, writing the backout record for the identified transaction to the log; and
      resuming normal logging.

9. The apparatus according to claim 8, wherein the trimming comprises:
   determining an oldest log record still required for any active transaction other than the identified transaction; and
   deleting log records created prior to the determined oldest log record.

10. The apparatus according to claim 8, wherein the indicating further comprises storing data identifying the transaction in a predetermined area of non-volatile storage.

11. The apparatus according to claim 8, wherein the indicating further comprises sending a notification identifying the transaction for which the writing of the backout record to the log is being delayed.

12. The apparatus according to claim 11, wherein sending the notification comprises sending a message in human-readable form to an administrator.

13. The apparatus according to claim 8, wherein the functions further comprise:
   subsequent to the resuming of normal logging, discovering that the log an incomplete set of log records for a particular transaction;
   responsive to the discovery, comparing whether the particular transaction is the identified transaction for which the writing of the backout record was delayed, and if so, ignoring the discovery of the incomplete set of log records.

14. The apparatus according to claim 8, wherein the log-full condition is detected by monitoring an amount of available space for storing log records in the transaction log.

15. A computer program element comprising computer program code to, when loaded into a computer system and executed thereon, cause the computer to perform a method for managing a log-full condition of a transaction log in a transaction processing system, the transaction log comprising a plurality of log records each associated with a particular transaction, the method comprising:
responsive to detecting the log-full condition, performing:
identifying an active transaction having an oldest log entry of all active transactions having records in the log;
temporarily suspending logging for all transactions except for the identified transaction;
initiating a dynamic transaction backout of the identified transaction; and
indicating that a backout record is written for the identified transaction to the log, the backout record serving to indicate that the identified transaction is backed out, although delaying the writing of the backout record to the log; and
responsive to receiving confirmation that the backout of the identified transaction has completed, performing
trimming the log;
responsive to completion of the trimming, writing the backout record for the identified transaction to the log; and
resuming normal logging.

16. The computer program element according to claim 15, wherein the trimming comprises:
determining an oldest log record still required for any active transaction other than the identified transaction; and
deleting log records created prior to the determined oldest log record.

17. The computer program element according to claim 15, wherein the indicating further comprises storing data identifying the transaction in a predetermined area of non-volatile storage.

18. The computer program element according to claim 15, wherein the indicating further comprises sending a notification identifying the transaction for which the writing of the backout record to the log is being delayed.

19. The computer program element according to claim 18, wherein sending the notification comprises sending a message in human-readable form to an administrator.

20. The computer program element according to claim 15, further comprising:
subsequent to the resuming of normal logging, discovering that the log an incomplete set of log records for a particular transaction;
responsive to the discovery, comparing whether the particular transaction is the identified transaction for which the writing of the backout record was delayed, and if so, ignoring the discovery of the incomplete set of log records.

\* \* \* \* \*